US008416305B2

(12) United States Patent
Huang et al.

(10) Patent No.: US 8,416,305 B2
(45) Date of Patent: Apr. 9, 2013

(54) PORTABLE WI-FI DIGITAL VIDEO CAMCORDER AND SYSTEM WITH THEREOF

(75) Inventors: Wei-Cheng Huang, Taipei County (TW); Mei-Yi Tsai, Taipei County (TW); Chih-Liang Chou, Taipei County (TW)

(73) Assignee: Chicony Electronics Co., Ltd., Taipei (TW)

( * ) Notice: Subject to any disclaimer, the term of this patent is extended or adjusted under 35 U.S.C. 154(b) by 450 days.

(21) Appl. No.: 12/731,150

(22) Filed: Mar. 25, 2010

(65) Prior Publication Data

US 2011/0162029 A1    Jun. 30, 2011

(30) Foreign Application Priority Data

Dec. 31, 2009 (TW) .............................. 98146557 A

(51) Int. Cl.
*H04N 5/225* (2006.01)
(52) U.S. Cl.
USPC ................ 348/207.1; 348/211.9; 348/211.12; 709/223; 455/41.2
(58) Field of Classification Search .................. 455/41.2, 455/432.2, 41.3; 709/223, 224; 348/207.99–207.11, 348/211.9–211.39, 211.12; 386/200
See application file for complete search history.

(56) References Cited

U.S. PATENT DOCUMENTS

| 6,963,358 | B2 | 11/2005 | Cohen et al. |
| 2006/0215622 | A1 | 9/2006 | Abdel-Kader et al. |
| 2007/0237093 | A1 | 10/2007 | Rajagopalan |
| 2008/0052384 | A1* | 2/2008 | Marl et al. ..................... 709/223 |
| 2008/0232299 | A1 | 9/2008 | Mosig |
| 2009/0022117 | A1 | 1/2009 | Quigley et al. |
| 2009/0185792 | A1 | 7/2009 | Braunstein et al. |
| 2010/0167697 | A1* | 7/2010 | Ishikawa et al. ............. 455/411 |
| 2010/0227610 | A1* | 9/2010 | Jabara et al. ................ 455/432.3 |
| 2010/0297943 | A1* | 11/2010 | Kaplan et al. ................ 455/41.2 |
| 2011/0096168 | A1* | 4/2011 | Siann et al. .................. 348/158 |
| 2011/0134846 | A1* | 6/2011 | Abdel-Kader et al. ....... 370/328 |

FOREIGN PATENT DOCUMENTS

| CN | 1815408 A | 8/2006 |
| CN | 101175004 A | 5/2008 |
| CN | 101448140 A | 6/2009 |
| CN | 201378849 Y | 1/2010 |
| DE | 102006018092 A1 | 10/2007 |
| DE | 102006043667 A1 | 3/2008 |
| TW | 200610361 | 3/2006 |
| TW | 200830781 | 7/2008 |
| TW | 200913674 | 3/2009 |
| TW | 200922344 | 5/2009 |
| TW | M364224 | 9/2009 |
| TW | M366948 | 10/2009 |

* cited by examiner

*Primary Examiner* — Thai Tran
*Assistant Examiner* — Mishawn Dunn
(74) *Attorney, Agent, or Firm* — CKC & Partners Co., Ltd.

(57) ABSTRACT

A portable Wi-Fi digital video camcorder includes a battery, a wireless network unit, an LCD unit, a video-stream capturing unit and a processing unit. The battery supplies power to the portable Wi-Fi digital video camcorder. The video-stream capturing unit captures a present video stream. The processing unit is electrically connected with the wireless network unit, the LCD unit and the video-stream capturing unit. The processing unit includes an LCD driving module and a video-stream transmitting module. The LCD driving module drives the LCD unit. The video-stream transmitting module utilizes the wireless network unit to transmit the present video stream.

21 Claims, 1 Drawing Sheet

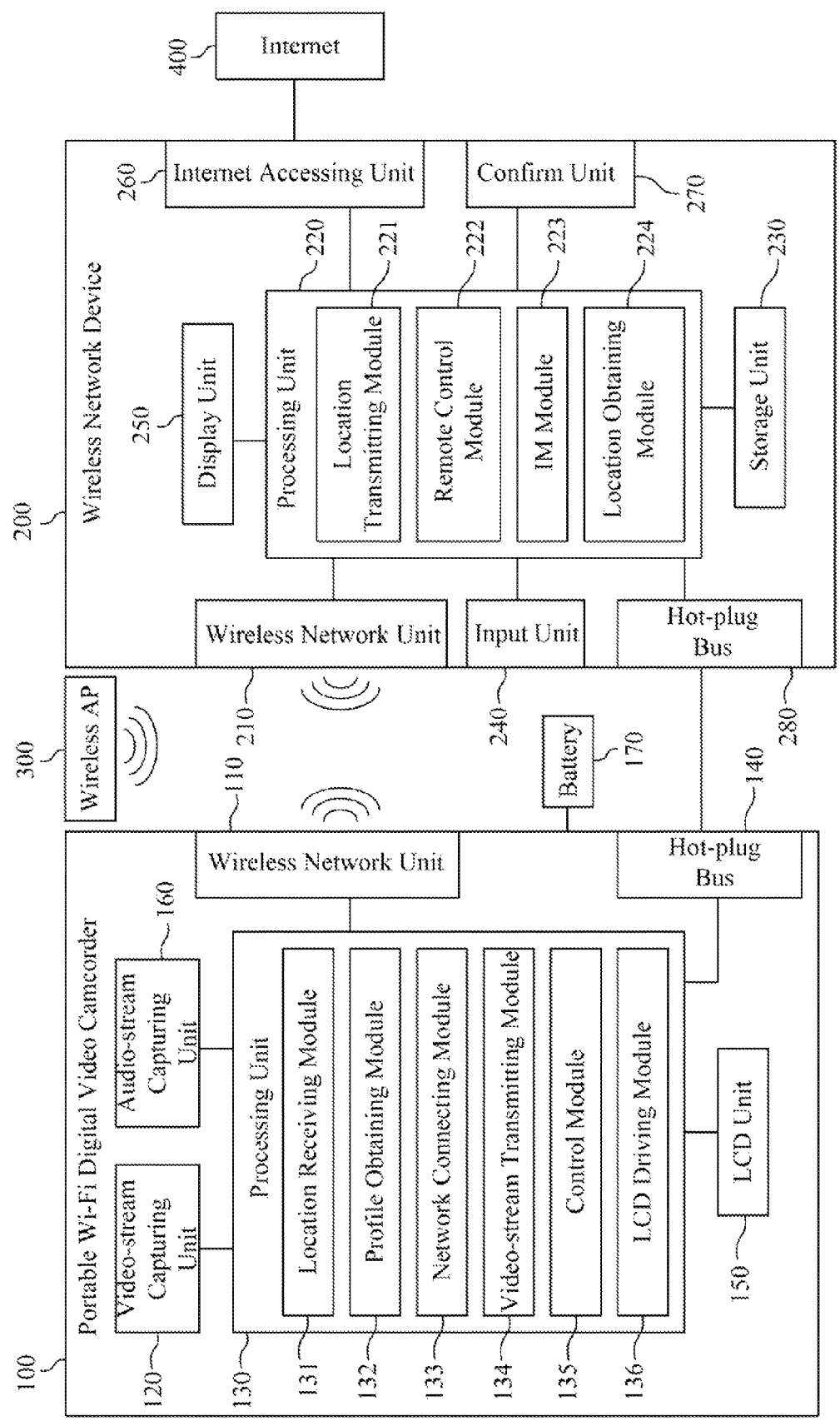

PORTABLE WI-FI DIGITAL VIDEO CAMCORDER AND SYSTEM WITH THEREOF

RELATED APPLICATIONS

This application claims priority to Taiwan Application Serial Number 98146557, filed Dec. 31, 2009, which is herein incorporated by reference.

BACKGROUND

1. Technical Field

The present invention relates to a wireless network device and a system with thereof. More particularly, the present invention relates to a portable Wi-Fi video camcorder and a system with thereof.

2. Description of Related Art

Wireless network refers to any type of computer network that is wireless, and is commonly associated with a telecommunications network whose interconnections between nodes is implemented without the use of wires. Wireless telecommunications networks are generally implemented with some type of remote information transmission system that uses electromagnetic waves, such as radio waves, for the carrier and this implementation usually takes place at the physical level or "layer" of the network.

Since network service can be obtained through wireless network without a network cable connected, wireless network service becomes more and more popular. In addition, as transmission rate of wireless network develops, more and more devices, such as computers, Personal Digital Assistants (PDAs), Digital Photo Frame (DPF), apply wireless network for network connection. Therefore, there is a trend to transmit data through wireless network.

SUMMARY

According to one embodiment of this invention, a system with a portable Wi-Fi digital video camcorder is provided. The portable Wi-Fi digital video camcorder includes a battery, a wireless network unit, a liquid crystal display (LCD) unit, a video-stream capturing unit and a processing unit. The battery supplies power to the portable Wi-Fi digital video camcorder. The video-stream capturing unit captures a present video stream. The processing unit is electrically connected with the wireless network unit, the LCD unit and the video-stream capturing unit. The processing unit includes an LCD driving module and a video-stream transmitting module. The LCD driving module drives the LCD unit. The video-stream transmitting module utilizes the wireless network unit to transmit the present video stream.

According to another embodiment of this invention, a portable Wi-Fi digital video camcorder includes a battery, a wireless network unit, an LCD unit, a video-stream capturing unit and a processing unit. The battery supplies power to the portable Wi-Fi digital video camcorder. The video-stream capturing unit captures a present video stream. The processing unit is electrically connected with the wireless network unit, the LCD unit and the video-stream capturing unit. The processing unit includes an LCD driving module and a video-stream transmitting module. The LCD driving module drives the LCD unit. The video-stream transmitting module utilizes the wireless network unit to transmit the present video stream.

According to another embodiment of this invention, a system with portable Wi-Fi digital video camcorder includes a portable Wi-Fi digital video camcorder and a wireless network device. The portable Wi-Fi digital video camcorder includes a battery, a first wireless network unit, a LCD unit, a video-stream capturing unit and a first processing unit. The first processing unit is electrically connected with the first wireless network unit, the LCD unit and the video-stream capturing unit. The battery supplies power to the portable Wi-Fi digital video camcorder. The video-stream capturing unit captures a present video stream. The first processing unit includes an LCD driving module, a video-stream transmitting module. The LCD driving module drives the LCD unit. The video-stream transmitting module utilizes the first wireless network unit to transmit the present video stream. The wireless network device includes a second wireless network unit an Internet accessing unit a display unit a second processing unit. The second processing unit is electrically connected with the second wireless network unit, the Internet accessing unit and the display unit. The second processing unit includes an instant message (IM) module. The IM module utilizes an IM application to transmit the present video stream, which is received from the portable Wi-Fi digital video camcorder utilizing the second wireless network unit, through Internet with the Internet accessing unit. The IM module utilizes the IM application to receive a remote video stream and drives the display unit to display the remote video stream through Internet with the Internet accessing unit.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawing as follows:

FIG. 1 is a block diagram of a system with a portable Wi-Fi digital video camcorder according to one embodiment of this invention.

DETAILED DESCRIPTION

Reference will now be made in detail to the present embodiments of the invention, examples of which are illustrated in the accompanying drawing. Wherever possible, the same reference numbers are used in the drawing and the description to refer to the same or like parts.

FIG. 1 is a block diagram of a system with a portable Wi-Fi digital video camcorder according to one embodiment of this invention. The portable Wi-Fi digital video camcorder transmits a video stream through wireless network.

The system includes a portable Wi-Fi digital video camcorder 100. The portable Wi-Fi digital video camcorder 100 includes a wireless network unit 110, a video-stream capturing unit 120, a processing unit 130, an LCD unit 150 and a battery 170. The processing unit 130 is electrically connected with the wireless network unit 110, the video-stream capturing unit 120 and the LCD unit 150.

The battery 170 supplies power to the portable Wi-Fi digital video camcorder 100. The video-stream capturing unit 120 captures a present video stream. The processing unit 130 includes a video-stream transmitting module 134 and an LCD driving module 136. The video-stream transmitting module 134 utilizes the wireless network unit 110 to transmit the present video stream captured by the video-stream capturing unit 120. The LCD driving module 136 drives the LCD unit 150.

The wireless network unit 110 may transmit the present video stream captured by the video-stream capturing unit 120 to other wireless network device utilizing Ad-hoc network mode of Wi-Fi network. In addition, the wireless network unit 110 may transmit the present video stream through a wireless access point (AP). Therefore, the system may include a wireless AP 300, and the processing unit 130 may include a network connecting module 133. The network connecting module 133 may utilize the wireless network unit 110 to build connection with the wireless AP 300 according to a wireless AP profile. The wireless AP 300 may follow Wi-Fi standards. Therefore, Wi-Fi instructions may be utilized to transmit data between the portable Wi-Fi digital video camcorder 100 and the wireless AP 300.

The portable Wi-Fi digital video camcorder 100 may obtain the wireless AP profile, which is utilized for building connection with the wireless AP 300, from other wireless network devices. Therefore, the system may include a wireless network device 200. The wireless network device 200 may be a computer, a PDA, a DPF, a mobile phone or other electrical devices supporting wireless network. The wireless network device 200 includes a wireless network unit 210 and a processing unit 220, which are electrically connected with each other.

The processing unit 220 includes a location transmitting module 221. The location transmitting module 221 utilizes the wireless network unit 210 to build connection with the portable Wi-Fi digital video camcorder 100. Wherein, the location transmitting module 221 may keep receiving a wireless network device ID and determine if the received wireless network device ID is the device ID of the portable Wi-Fi digital video camcorder 100. If the received wireless network device ID is the device ID of the portable Wi-Fi digital video camcorder 100, the device transmitting the wireless network device ID thereof is taken as the portable Wi-Fi digital video camcorder 100. Hence, the device ID of the portable Wi-Fi digital video camcorder 100 may be set to, a specified ID for determination thereof.

After the portable Wi-Fi digital video camcorder 100 is sensed, the location transmitting module 221 utilizes the wireless network unit 210 to transmit a storage location, at which the wireless AP profile is stored, to the wireless network unit 110. The wireless AP profile may include an AP Identifier (ID) of the wireless AP 300, an encryption method utilized by the wireless AP 300, a key to the encryption method utilized by the wireless AP 300, or any other information related to the wireless AP 300. Wherein, a Service Set Identifier (SSID) of the wireless AP 300 may be utilized as the AP ID of the wireless AP 300. The encryption method utilized by the wireless AP 300 may be Wired Equivalent Privacy (WEP), WiFi Protected Access (WPA), WPA2 or any other encryption method. In addition, Ad-hoc network mode of Wi-Fi can be utilized to build connection between the wireless network unit 110 of the portable Wi-Fi digital video camcorder 100 and the wireless network unit 210 of the wireless network device 200 and transmit the wireless AP profile.

In another embodiment, the wireless network device 200 may include a confirm unit 270 electrically connected with the processing unit 220. The confirm unit 270 generates a confirm signal to the processing unit 220 after operated. The location transmitting module 221 utilizes the wireless network unit 210 to transmit the storage location to the portable Wi-Fi digital video camcorder 100 after the confirm signal is received. The confirm unit 270 may be a button, a key or any other component which can be utilized to generate the confirm signal. Therefore, users may operate the confirm unit 270 to trigger the confirm unit 270 to generate the confirm signal and make the wireless network device 200 start to transmit the storage location.

The processing unit 130 of the portable Wi-Fi digital video camcorder 100 may include a location receiving module 131 and a profile obtaining module 132. The location receiving module 131 receives the storage location, at which the wireless AP profile is stored. Wherein, the location receiving module 131 may receive the storage location utilizing the wireless network unit 110. In another embodiment, the location receiving module 131 may receive the storage location through an input unit, such as a button, a keyboard or any other input unit. In still another embodiment, the location receiving module 131 may receive the storage location through a software-implemented user interface. The profile obtaining module 132 obtains the wireless AP profile from the storage location. Therefore, users don't need to input the wireless AP profile for the portable Wi-Fi digital video camcorder 100, which is complicated and annoyed for users.

The wireless network device 200 may provide its wireless AP profile to the portable Wi-Fi digital video camcorder 100. Therefore, the wireless network device 200 may include a storage unit 230 electrically connected with the processing unit 220. The storage unit 230 stores the wireless AP profile, according to which the wireless network device 200 builds connection with the wireless AP 300. The storage unit 230 may be a hard disk, a flash disk, a hybrid disk or other types of storage unit, which can store data. Therefore, the storage location may be directed to the storage unit 230, and the profile obtaining module 132 may obtain the wireless AP profile from the storage unit 230 according to the storage location. Wherein, the processing unit 220 of the wireless network device 200 may include a location obtaining module 224 to obtain the storage location of the wireless AP profile stored in the storage unit 230. Hence, the location transmitting module 221 can transmit the obtained storage location to the portable Wi-Fi digital video camcorder 100. Therefore, the portable Wi-Fi digital video camcorder 100 may build connection with the wireless AP 300 according to the wireless AP profile utilized by the wireless network device 200.

In addition, the portable Wi-Fi digital video camcorder 100 may obtain the wireless AP profile from a hot-plug bus. Therefore, the portable Wi-Fi digital video camcorder 100 may include a hot-plug bus 140 electrically connected with the processing unit 130. The hot-plug bus 140 may be Universal Serial Bus (USB), IEEE1394 or any other hot-plug bus. In one embodiment, the wireless network device 200 may include a hot-plug bus electrically connected with the processing unit 220. Then, the hot-plug bus 140 of the portable Wi-Fi digital video camcorder 100 can be connected with the hot-plug bus 280 of the wireless network device 200, and the wireless AP profile may be transmitted through the hot-plug bus 280 to the hot-plug bus 140. Wherein, the storage location can be directed to the hot-plug bus 140 to make the profile obtaining module 132 obtain the wireless AP profile through the hot-plug bus 140.

Besides, users can control the portable Wi-Fi digital video camcorder 100 through the wireless network device 200. Therefore, the processing unit 130 of the portable Wi-Fi digital video camcorder 100 may include a control module 135, the wireless network device 200 may include an input unit 240, and the processing unit 220 of the wireless network device 200 may include a remote control module 222. The input unit 240 may be a mouse, a keyboard, a touch panel or any other input unit. The remote control module 222 receives a control instruction, which is used to control the portable Wi-Fi digital video camcorder 100, through the input unit 240, and utilizes the wireless network unit 210 to transmit the control instruction to the portable Wi-Fi digital video camcorder 100. The control module 135 controls the portable Wi-Fi digital video camcorder 100 according to the control instruction, which is received utilizing the wireless network unit 110. Therefore, users can control the portable Wi-Fi digital video camcorder 100 through the wireless network device 200 remotely.

The present video stream captured by the portable Wi-Fi digital video camcorder 100 can be displayed on the wireless network device 200. Therefore, the wireless network device 200 may include a display unit 250 electrically connected with the processing unit 220. When the wireless network unit 210 of the wireless network device 200 receives the present video stream captured by the portable Wi-Fi digital video camcorder 100, the processing unit 220 drives the display unit 250 to display the received present video stream. Therefore, the present video stream captured by the portable Wi-Fi digital video camcorder 100 can be displayed on another device through wireless network.

The portable Wi-Fi digital video camcorder 100 may display remote video stream as well. Therefore, the processing unit 130 may include a remote video stream processing module. The remote video stream processing module receives a remote video stream utilizing the wireless network unit 110 and makes the LCD driving module 136 drive the LCD unit 150 to display the remote video stream.

Besides, a video conferencing may be held utilizing the wireless network device 200 and the portable Wi-Fi digital video camcorder 100. Therefore, the wireless network device 200 may include an Internet accessing unit 260, and the processing unit 220 may include an instant message (IM) module 223. The Internet accessing unit 260 is electrically connected with the processing unit 220 and access Internet 400. Wherein, the Internet accessing unit 260 may be a wired network unit, a wireless network unit or any other component accessing Internet 400. The IM module 223 utilizes an IM application to transmit the present video stream captured by the portable Wi-Fi digital video camcorder 100, receives a remote video stream and drives the display unit 250 to display the remote video stream through Internet 400 with the Internet accessing unit 260. Therefore, users can utilize the wireless network device 200 and the portable Wi-Fi digital video camcorder 100 for video conferencing.

The portable Wi-Fi digital video camcorder 100 may capture an audio stream and transmit the captured audio stream through wireless network. Therefore, the portable Wi-Fi digital video camcorder 100 may include an audio capturing unit 160. The audio capturing unit 160 captures a present audio stream. The processing unit 130 utilizes the wireless network unit 110 to to transmit the present audio stream. Wherein the audio capturing unit 160 may be a microphone or any other component to capture audio stream.

Above all, a portable Wi-Fi digital video camcorder can transmit captured video stream through wireless network. In addition, a wireless network device can receive the video stream captured by the portable Wi-Fi digital video is camcorder directly from the portable Wi-Fi digital video camcorder or through a wireless AP. Besides, a wireless AP profile, according to which the portable Wi-Fi digital video camcorder builds connection with a wireless AP, can be obtained from an assigned storage location. Therefore, users don't need to input the wireless AP profile for the portable Wi-Fi digital video camcorder, which is complicated and annoyed for users. Since the portable Wi-Fi digital video camcorder may transmit a present captured video stream and display a remote video stream, the portable Wi-Fi digital video camcorder can be utilized to interact with others, such as holding a video conferencing. Besides, the portable Wi-Fi digital video camcorder can be controlled remotely. In addition, a battery supplies power to the portable Wi-Fi digital video camcorder, and data is transmitted through Wi-Fi network. Therefore, users can carry the portable Wi-Fi digital video camcorder easily.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system with portable Wi-Fi digital video camcorder, comprising:
    a wireless access point (AP);
    a wireless network device, comprising:
        a second wireless network unit; and
        a second processing unit, electrically connected with the second wireless network unit;
        a location transmitting module, utilizing the second wireless network unit to transmit a storage location, at which AP profile is stored, wherein the wireless AP profile is utilized for building connection with the wireless AP;
    a portable Wi-Fi digital video camcorder, comprising:
        a battery, supplying power to the portable Wi-Fi digital video camcorder;
        a first wireless network unit, wherein the second processing unit of the wireless network device utilizes the second wireless network unit to build connection with the first wireless network unit of the portable Wi-Fi digital video camcorder, and the location transmitting module transmits the storage location to the wireless network unit;
        a liquid crystal display (LCD) unit;
        a video-stream capturing unit, capturing a present video stream; and
        a first processing unit, electrically connected with the first wireless network unit, the LCD unit and the video-stream capturing unit, comprising:
            an LCD driving module, driving the LCD unit;
            a profile obtaining module, obtaining the wireless AP profile from the wireless network service;
            a network connecting module utilizing the first wireless network unit to build connection with the wireless AP according to the wireless AP profile; and
            a video-stream transmitting module, utilizing the first wireless network unit to transmit the present video stream to the wireless network device through the wireless AP.

2. The system with portable Wi-Fi digital video camcorder of claim 1, wherein the wireless network device further comprises:
    a confirm unit, electrically connected with the second processing unit, wherein the confirm unit generates a confirm signal to the second processing unit after operated, such that the location transmitting module utilizes the second wireless network unit to transmit the storage location to the portable Wi-Fi digital video camcorder after the confirm signal is received.

3. The system with portable Wi-Fi digital video camcorder of claim 1, wherein the wireless network device further comprises.
   a storage unit, electrically connected with the second processing unit, storing the wireless AP profile, wherein the storage location is directed to the storage unit such that the profile obtaining module obtains the wireless AP profile from the wireless network device.

4. The system with portable Wi-Fi digital video camcorder of claim 1, wherein the portable Wi-Fi digital video camcorder further comprises:
   a hot-plug bus, electrically connected with the first processing unit, wherein the location transmitting module transmits the storage location, which is directed to the hot-plug bus, to the first wireless network unit, such that the profile obtaining module of the first processing unit obtains the wireless AP profile through the hot-plug bus.

5. The system with portable Wi-Fi digital video camcorder of claim 4, wherein the hot-plug bus is Universal Serial Bus (USB) or IEEE1394.

6. The system with portable Wi-Fi digital video camcorder of claim 1, wherein the second wireless network unit builds connection with the first wireless network unit utilizing Ad-hoc network.

7. The system with portable Wi-Fi digital video camcorder of claim 1, wherein the wireless network device further comprises an input unit, and the second processing unit further comprise:
   a remote control module, receiving a control instruction, which is used to control the portable Wi-Fi digital video camcorder, through the input unit, and utilizing the second wireless network unit to transmit the control instruction to the portable Wi-Fi digital video camcorder, such that the first processing unit controls the portable Wi-Fi digital video camcorder according to the control instruction.

8. The system with portable Wi-Fi digital video camcorder of claim 1, wherein the wireless network device further comprises:
   a display unit, electrically connected with the second processing unit, wherein the second processing unit drives the display unit to display the present video stream when the second wireless network unit receives the present video stream.

9. The system with portable Wi-Fi digital video camcorder of claim 1, wherein the wireless network device further comprises:
   an Internet accessing unit, electrically connected with the second processing unit, accessing Internet, and
   a display unit, electrically connected with the second processing unit,
   wherein the second processing unit further comprises:
   an instant message (IM) module, utilizing an IM application to transmit the present video stream, receive a remote video stream and drives the display unit to display the remote video stream through Internet with the Internet accessing unit.

10. The system with portable Wi-Fi digital video camcorder of claim 1, wherein the portable Wi-Fi digital video camcorder further comprises:
   an audio capturing unit, capturing a present audio stream, wherein the first processing utilizing the first wireless network unit to transmit the present audio stream.

11. A portable Wi-Fi digital video camcorder, comprising.
   a battery, supplying power to the portable Wi-Fi digital video camcorder;
   a wireless network unit:
   an LCD unit;
   a video-stream capturing unit, capturing a present video stream; and
   a processing unit, electrically connected with the wireless network unit, the LCD unit and the video-stream capturing unit, comprising:
   an LCD driving module, driving the LCD unit;
   a location receiving module, receiving a storage location, wherein a wireless AP profile stored at the storage location can be utilized for building connection with a wireless AP;
   a profile obtaining module, obtaining the wireless AP profile according to the storage location;
   a network connection module utilizing the first wireless network unit to build connection with the wireless AP according to the wireless AP profile; and
   a video-stream transmitting module, utilizing the wireless network unit to transmit the present video stream through the wireless AP.

12. The portable Wi-Fi digital video camcorder of claim 11, wherein the storage location is received by the wireless network unit utilizing Ad-hoc mode.

13. The portable Wi-Fi digital video camcorder of claim 11, wherein the storage location is directed to a wireless network device, such that the profile obtaining module obtains the wireless AP profile from the wireless network device.

14. The portable Wi-Fi digital video camcorder of claim 11, further comprises:
   a hot-plug bus, electrically connected with the processing unit, wherein the storage location is directed the hot-plug bus, the profile obtaining module obtains the wireless AP profile through the hot-plug bus according to the storage location.

15. The portable Wi-Fi digital video camcorder of claim 14, wherein the hot-plug bus is USB or IEEE1394.

16. The portable Wi-Fi digital video camcorder of claim 11, wherein the processing unit further comprises:
   a control module, controlling the portable Wi-Fi digital video camcorder according to the control instruction, which is received utilizing the wireless network unit.

17. The portable Wi-Fi digital video camcorder of claim 11, wherein the processing unit further comprises:
   a remote video stream processing module, receiving a remote video stream utilizing the wireless network unit and making the LCD driving module drive the LCD unit to display the remote video stream.

18. The portable Wi-Fi digital video camcorder of claim 11, further comprising:
   an audio capturing unit, capturing a present audio stream, w herein the first processing unit utilizing the first wireless network unit to transmit the present audio stream.

19. A system with portable Wi-Fi digital video camcorder, comprising:
   a portable Wi-Fi digital video camcorder, comprising:
   a battery, supplying power to the portable Wi-Fi digital video camcorder;
   a first wireless network unit;
   a liquid crystal display (LCD) unit;
   a video-stream capturing unit, capturing a present video stream; and a first processing unit, electrically connected with the first wireless network unit, the LCD unit and the video-stream capturing unit, comprising:
   an LCD driving module, driving the LCD unit;
   a location receiving module, receiving a storage location, wherein a wireless AP profile stored at the storage location can be utilized for building connection with the wireless AP;
   a profile obtaining module, obtaining the wireless AP profile according to the storage location;
   a network connection module utilizing the first wireless network unit to build connection with the wireless AP according to the wireless AP profile; and
   a video-stream transmitting module, utilizing the first wireless network unit to transmit the present video stream through the wireless AP; and
a wireless network device, comprising:
a second wireless network unit;
an Internet accessing unit, accessing internet,
a display unit; and
a second processing unit, electrically connected with the second wireless network unit, the Internet accessing unit and the display unit, comprising:
   an IM module, utilizing an IM application to transmit the present video stream, which is received from the portable Wi-Fi digital video camcorder utilizing the second wireless network unit, receive a remote video stream and drives the display unit to display the remote video stream through Internet with the Internet accessing unit.

20. The system with portable Wi-Fi digital video camco of claim 19,
   wherein the IM module makes he second wireless network unit receive th Present video stream through the wireless AP.

21. The system with portable Wi-Fi digital video camcorder of claim 19, wherein the IM module makes the second wireless network unit receive the present video stream from the portable Wi-Fi digital video camcorder utilizing Ad-hoc network mode.

* * * * *